O. E. OLESON.
STOP AND CHECK VALVE.
APPLICATION FILED OCT. 21, 1912.

1,216,352.

Patented Feb. 20, 1917.

Witnesses:
Leslie W. Fricke
Robert F. Bracke

Inventor
Olaf E. Oleson
By Brown & Williams
Attorneys

UNITED STATES PATENT OFFICE.

OLAF E. OLESON, OF CHICAGO, ILLINOIS, ASSIGNOR TO THE EDWARD STEAM SPECIALTY CO., OF CHICAGO, ILLINOIS, A CORPORATION OF ILLINOIS.

STOCK AND CHECK VALVE.

1,216,352. Specification of Letters Patent. Patented Feb. 20, 1917.

Application filed October 21, 1912. Serial No. 726,883.

*To all whom it may concern:*

Be it known that I, OLAF E. OLESON, a citizen of the United States, residing at Chicago, in the county of Cook and State of Illinois, have invented a certain new and useful Improvement in Stop and Check Valves, of which the following is a full, clear, concise, and exact description, reference being had to the accompanying drawings, forming a part of this specification.

My invention relates to stop and check valves and has for its object a more simplified and efficient arrangement than has been secured in devices of this class. My invention is of particular utility in cases where fluid is flowing through pipes under high pressure. My invention provides means whereby a check valve is associated with other mechanism so that the check valve may be closed positively against actuation by the fluid flowing through the pipes and through the valve proper. In the preferred embodiment of my invention, the arrangement is such that it may be associated with vertical piping through which flows fluid under high pressure, such for example as steam. This fluid under certain pressure will keep the valve open, and when the pressure decreases, the valve is adapted to close automatically. In addition to this, mechanism is employed to positively close the valve to prevent the actuation thereof by the fluid. My invention will be clearly understood reference being had to the accompanying drawing in which:

Figure 2:
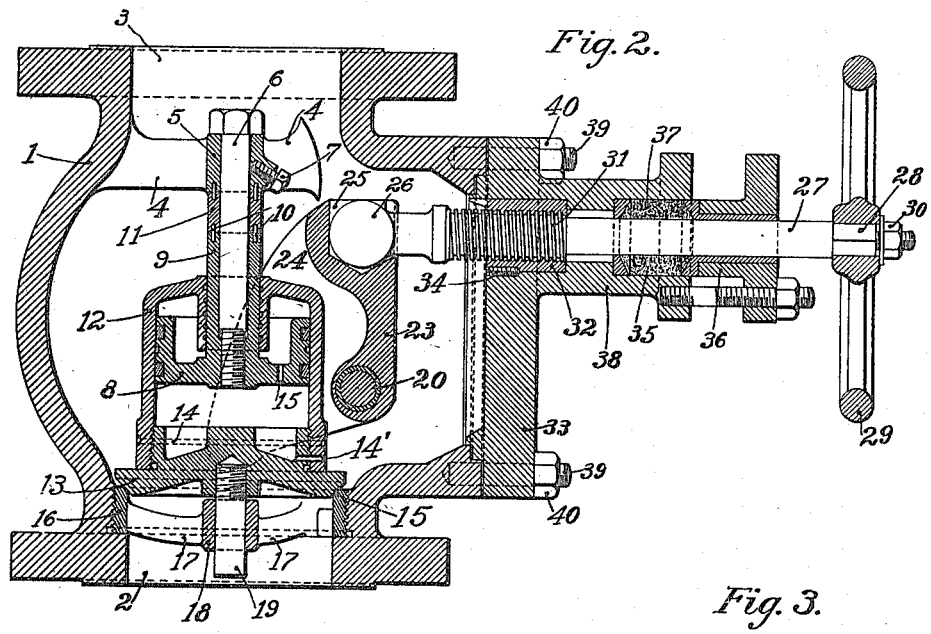
Fig. 2 is a cross-sectional view taken on line 2—2 of Fig. 1.
Figure 1:
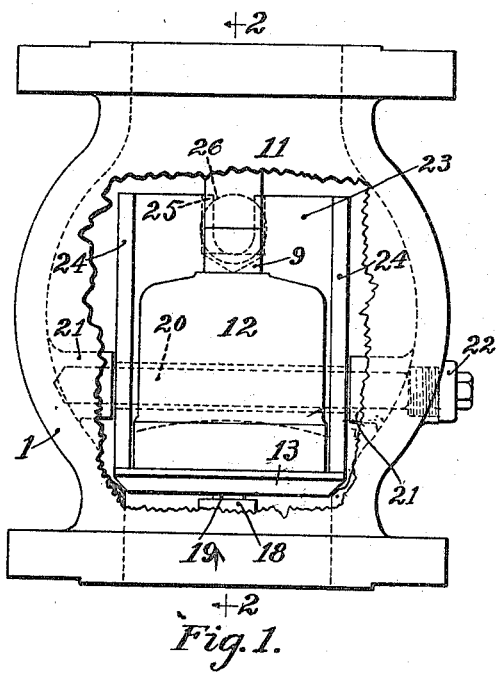
Figure 1 is an elevational view of the mechanism embodying the preferred form of my invention.
Figure 3:
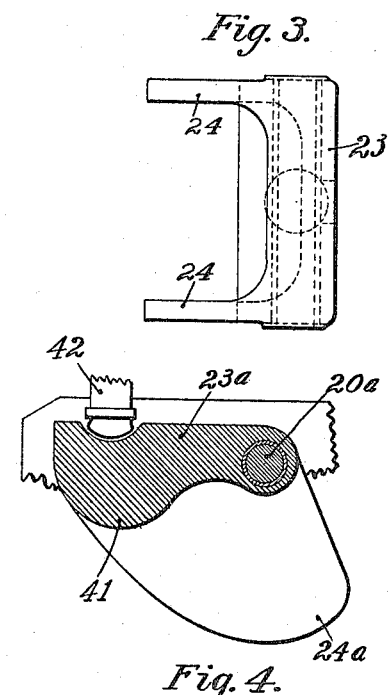
Fig. 3 is a view of the bell crank lever employed in conjunction with the check valve arrangement.

The preferred form of my invention shown in Figs. 1, 2 and 3 comprises a casing 1, which has an inlet end 2, and an outlet end 3. In the outlet end there is a plurality of arms 4—4 which are arranged to support centrally in the casing a sleeve 5, through which extends a rod 6, held in place by means of a threaded bolt 7. This rod 6, extends vertically through the center of the valve and is threaded at one end into a piston 8, this piston being provided with a sleeve 9, which surrounds the rod and is connected by means of dowel pins 10—10 to a sleeve 11, which is connected to the sleeve 5 by means of dowel pins. This arrangement provides an easy way of assembling the parts. The piston 8, is arranged to slide within a cup 12, which has at its upper end a long bearing engaging the sleeve 9, so as to secure a proper bearing surface. The cup 12, is threaded at its lower end to a disk 13, as shown, and a pin 14, is employed to hold these two parts positively together. A small opening 14' is drilled through the disk 13 and cup 12. The piston is also provided with an opening 15. The piston and the cup and the upper part of the disk form a dash pot arrangement, and these openings are for the purpose of admitting the proper amount of air to both sides of the piston of the dash pot. The disk 13 is beveled, as shown, and engages a seat 15 formed on the member 16, which is threaded into the casing 1. The member 16 has a plurality of supporting arms 17, extending therefrom, which terminate in a supporting member 18, which surrounds a rod 19, that is securely threaded into the disk 13. This rod provides means for centering the disk 13 so that it will properly engage the seat when it is in its down position. It may be here stated that the weight of this disk and the cup 12 is sufficient to keep the disk 13 properly seated when the pressure in the delivery end of the valve is lower than the pressure in the supply end of the valve. The casing 1 has a pivot rod 20 mounted in bearings 21—21 and held in place therein by means of a threaded plug 22 screwed into place from the outside of the casing. A bell crank lever 23, is pivoted upon the rod 20 and has two side members 24—24 which are arranged to engage the disk 13, as shown in Figs. 1 and 2. The upper portion of the bell crank lever is provided with a recess 25, which has engaging therein, an enlarged portion 26 of a rod 27, which has a square end 28, for engagement with a hand wheel 29. The hand wheel is held against a shoulder on the rod 27 by means of a washer and nut 30. The rod 27 is provided with threads 31, which engage a sleeve 32 that is securely mounted in the cover 33 by means of a screw 34. This provides an arrangement by which the rod 27 may be either screwed into or out of the casing as occasion may require. Suitable packing 35 is provided so as to secure a tight fit around the rod 27. A gland 36 is employed to engage in an enlarged opening 37 in the neck portion 38 of the cover. Any suitable means may be used to clamp the gland into the proper position. I have shown the cover 33 as being held to the casing 1 by means of bolts and nuts 40.

When the arrangement is to be used as a check valve, the bell crank lever is rotated by means of the hand wheel 29, so as to bring the members 24—24 out of engagement with the disk 13. The fluid acting upon the disk will open the valve and keep it open as long as the pressure in the supply end of the casing is greater than that in the delivery end. The valve is opened very slowly owing to the dash pot arrangement previously described, and if the pressure in the supply end should decrease under that in the delivery end, the valve will close somewhat more slowly so as to prevent undue jarring of the associated mechanism. As shown in the drawing, particularly Figs. 1 and 2, the bell crank lever engages the disk 13, so that it is held tightly against its seat 15, for which condition no fluid will pass through the valve.

The foregoing description has been directed to a vertical valve or one in which vertical piping is employed to convey fluid from one place to another. I shall now describe briefly the arrangement particularly of the bell crank lever, when a horizontal valve is used.

Figure 4:
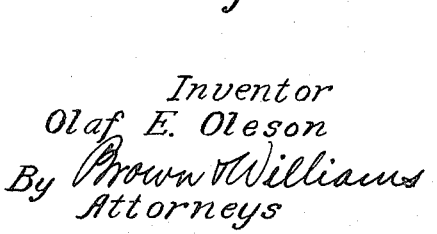
Fig. 4 is a view of a modified construction which is used with horizontal piping where the valve is employed horizontally instead of vertically, as in the preferred form.

Fig. 4 shows a bell crank lever 23ª, mounted upon a pivot rod 20ª, and having side members 24ª, which are employed to engage a disk in a manner similar to the arrangement shown in Fig. 2, except in this case the bell crank lever is weighted at 41, so that when the pressure in the supply end of the valve is lower than that in the delivery end, this weight will serve to actuate the valve disk to force it against its seat. An actuating rod 42, is employed to positively close the valve when necessary. This rod, however, normally does not engage the bell crank lever, thus permitting actuation of this lever in accordance with the pressure of the fluid flowing through the valve.

The valve arrangements which I have just described have many advantages over those of the prior art, among which may be mentioned the fact that the distance between the supply end and delivery end is very short, thus permitting the valve to be used as a gate valve when occasions demand.

I claim as new and desire to secure by Letters Patent:

1. In a stop and check valve, the combination of a casing, a check valve disposed within said casing, dash-pot mechanism connected with said valve, and a manually operable bell crank lever inside of the casing for positively holding said valve in closed position.

2. In a stop and check valve, the combination of a casing, a check valve within the casing, dash-pot mechanism connected with said valve, and manually-operated mechanism for engaging said valve at two diametrically-opposite points to positively close said valve.

In witness whereof, I hereunto subscribe my name this 14th day of October, A. D., 1912.

OLAF E. OLESON.

Witnesses:
ALBERT C. BELL,
CLIFFORD C. DEWEES.

Copies of this patent may be obtained for five cents each, by addressing the "Commissioner of Patents, Washington, D. C."